United States Patent [19]
Tadokoro et al.

[11] Patent Number: 6,088,196
[45] Date of Patent: *Jul. 11, 2000

[54] MAGNETORESISTIVE HEAD AND MANUFACTURING METHOD THEREFOR

[75] Inventors: Shigeru Tadokoro, Odawara; Katsuro Watanabe, Hitachi; Takao Imagawa, Mito; Yasunari Tajima, Odawara, all of Japan

[73] Assignee: Hitachi, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/888,524

[22] Filed: Jul. 7, 1997

Related U.S. Application Data

[63] Continuation of application No. 08/400,907, Mar. 8, 1995, abandoned.

[30] Foreign Application Priority Data

Mar. 9, 1994 [JP] Japan ..................................... 6-038092

[51] Int. Cl.[7] ....................................................... G11B 5/39
[52] U.S. Cl. ....................................................... 360/113
[58] Field of Search ..................................... 360/113, 126; 428/692, 694 T, 900; 204/192.2, 192.15; 148/301, 306, 310, 311

[56] References Cited

U.S. PATENT DOCUMENTS

| | | | |
|---|---|---|---|
| 5,227,940 | 7/1993 | Isomura et al. | 360/126 |
| 5,327,313 | 7/1994 | Nishioka et al. | 360/113 |
| 5,421,915 | 6/1995 | Nakanishi et al. | 148/304 |
| 5,429,731 | 7/1995 | Osano et al. | 204/192.2 |

FOREIGN PATENT DOCUMENTS

| | | |
|---|---|---|
| 60-170213 | 9/1985 | Japan . |
| 60-159518 | 10/1985 | Japan . |
| 63-164406 | 7/1988 | Japan . |

*Primary Examiner*—George J. Letscher
*Attorney, Agent, or Firm*—Pennie & Edmonds LLP

[57] ABSTRACT

A magnetoresistive head comprising a magnetoresistive film having electric resistance varying with a magnetic field, a pair of electrodes for causing a current to flow into the magnetoresistive film, and a soft magnetic film for applying a transverse biasing field to the magnetoresistive film, the soft magnetic film containing at least one material of iron, cobalt, and nickel, and at least one compound of zirconium oxide, aluminum oxide, hafnium oxide, titanium oxide, beryllium oxide, magnesium oxide, a rare earth oxygen compound, zirconium nitride, hafnium nitride, aluminum nitride, titanium nitride, beryllium nitride, magnesium nitride, silicon nitride, and a rare earth nitrogen compound. The electric resistance of the soft magnetic film is raised by adding a compound thereto and current diverted from the magnetoresistive film to the soft magnetic film decreases, so that the reproducing voltage of the magnetoresistive head rises.

22 Claims, 6 Drawing Sheets

ATOMIC % OF ALUMINUM ATOMS TO ALL METAL ATOMS

FIG. 6

| ADDITIVE | $H_{CE}$ (Oe) | $H_{CH}$ (Oe) | $H_k$ (Oe) | $B_s$ (T) |
|---|---|---|---|---|
| ZIRCONIUM OXIDE | 1.1 | 0.25 | 6.0 | 0.95 |
| ALUMINUM OXIDE | 1.2 | 0.30 | 6.5 | 0.90 |
| HAFNIUM OXIDE | 1.2 | 0.30 | 6.0 | 0.90 |
| TITANIUM OXIDE | 1.2 | 0.25 | 7.0 | 0.90 |
| BERYLLIUM OXIDE | 1.2 | 0.25 | 6.5 | 0.95 |
| MAGNESIUM OXIDE | 1.1 | 0.35 | 6.0 | 0.95 |
| CERIUM OXIDE | 1.3 | 0.40 | 7.5 | 0.90 |
| ZIRCONIUM NITRIDE | 1.5 | 0.40 | 6.5 | 0.90 |
| HAFNIUM NITRIDE | 1.5 | 0.40 | 6.5 | 0.90 |
| ALUMINUM NITRIDE | 1.5 | 0.35 | 7.0 | 0.90 |
| TITANIUM NITRIDE | 1.5 | 0.40 | 6.5 | 0.90 |
| BERYLLIUM NITRIDE | 1.6 | 0.40 | 6.5 | 0.90 |
| MAGNESIUM NITRIDE | 1.6 | 0.45 | 7.0 | 0.90 |
| SILICON NITRIDE | 1.7 | 0.45 | 7.0 | 0.90 |
| CERIUM NITRIDE | 1.7 | 0.40 | 7.0 | 0.90 |
| SILICON OXIDE | 2.0 | 0.60 | 15.0 | 0.85 |
| ZIRCONIUM | 1.2 | 0.30 | 4.0 | 0.50 |

Rows ZIRCONIUM OXIDE through CERIUM NITRIDE: PRESENT INVENTION
Rows SILICON OXIDE and ZIRCONIUM: CONTROL EXAMPLE $H_{CE}$ : COERCIVE FORCE IN EASY DIRECTION OF MAGNETIZATION $H_{CH}$ : COERCIVE FORCE IN HARD DIRECTION OF MAGNETIZATION $H_k$ : ANISOTROPY FIELD $B_s$ : SATURATION MAGNETIC FLUX DENSITY

FIG.7

| | MAGNETIC ALLOY | $H_{CE}$ (Oe) | $H_{CH}$ (Oe) | $H_k$ (Oe) | $B_s$ (T) |
|---|---|---|---|---|---|
| PRESENT INVENTION | IRON | 4.0 | 2.5 | 7.0 | 2.1 |
| | IRON AND COBALT | 4.0 | 2.0 | 8.0 | 2.3 |
| | NICKEL AND COBALT | 2.0 | 0.7 | 15.0 | 0.85 |
| CONTROL EXAMPLE | IRON (WITH NO ADDITIVE) | 8.0 | 7.0 | | 2.1 |
| | IRON AND COBALT (WITH NO ADDITIVE) | 6.0 | 5.5 | | 2.4 |
| | NICKEL AND COBALT (WITH NO ADDITIVE) | 4.0 | 1.5 | 13.0 | 0.90 |

$H_{CE}$ : COERCIVE FORCE IN EASY DIRECTION OF MAGNETIZATION $H_{CH}$ : COERCIVE FORCE IN HARD DIRECTION OF MAGNETIZATION $H_k$ : ANISOTROPY FIELD $B_s$ : SATURATION MAGNETIC FLUX DENSITY

MAGNETORESISTIVE HEAD AND MANUFACTURING METHOD THEREFOR

This is a continuation of application Ser. No. 08/400,907, filed Mar. 8, 1995, now abandoned.

BACKGROUND OF THE INVENTION

1. Field of the Invention

This invention relates to a magnetoresistive head and a manufacturing method therefor.

2. Description of the Related Art

A magnetoresistive head using a magnetoresistive film is known as a magnetic head that can read data from magnetic recording media at high sensitivity. It converts a magnetic signal on a magnetic recording medium into an electric signal on the basis that the electric resistance of the magnetoresistive film varies, depending on the direction of magnetization of the magnetic recording medium.

Already known is the structure of a magnetoresistive head comprising a soft magnetic film, which will be hereinafter referred to as a transverse biasing film, formed adjacent to a magnetoresistive film for raising the sensitivity of the magnetoresistive film by applying a transverse biasing field to the magnetoresistive film, from the transverse biasing film. The transverse biasing film is magnetically isolated from the magnetoresistive film by a nonmagnetic layer, but it is difficult to electrically insulate it from the magnetoresistive film. Therefore, the magnetoresistive film and transverse biasing film form a parallel electric circuit. Thus, to increase signal level of the magnetoresistive head, the electric resistance of the transverse biasing film needs to be increased. To apply a sufficient transverse biasing field to the magnetoresistive film, the transverse biasing film also needs to be made of a material having a low coercive force and a reasonably large saturation magnetic flux density.

A magnetoresistive head having an amorphous soft magnetic film as a transverse biasing film is disclosed in Japanese Utility Model Laid-Open Nor. Sho 60-159518.

A magnetic thin film comprising a compound added to a magnetic metallic alloy is disclosed in Japanese Patent Laid-Open No. Sho 60-170213. The magnetic thin film contains an alloy of at least one element of,iron, cobalt, and nickel and a partial oxide of a metal having a larger affinity for oxygen than the metals. The thin film has a large coercive force in the direction perpendicular to the substrate is described.

Further, magnetic thin films for magnetic head poles of a single phase, having composites containing an alloy of nickel and iron and a compound comprising metal and nonmetal that can be deposited at the same time without producing any precipitates, is disclosed in Japanese Patent Laid-Open No. Sho 63-164406, in which the fact that abrasion resistance of the magnetic poles is improved by using such magnetic thin films as the pole pieces is described.

The transverse biasing film must be made of a material having high electric resistance, a low coercive force, and a reasonably large saturation magnetic flux density, as described above. Since the transverse biasing field is an important parameter for determining the sensitivity of a magnetoresistive head and the linearity of reproducing waveforms, the transverse biasing film must have small variance in magnetic characteristics and remain unchanged in transverse biasing field magnitude.

If amorphous films are used as transverse biasing films, magnetic heads are expected to improve in reproducing voltage because amorphous films have high electric resistance. However, since the amorphous state is essentially a metastable state, the magnetic characteristics of the amorphous films change easily on application of a strong magnetic field or with temperature rise. Therefore, if amorphous films are used as transverse biasing films, the magnetic characteristics may change on application of a strong magnetic field or with temperature rise during the manufacturing process of the magnetic heads. It is difficult to stabilize the magnetic characteristics of the magnetic heads.

The magnetic thin film described in Japanese Patent Laid-Open No. Sho 60-170213 is a magnetic thin film having a large perpendicular coercive force and cannot be used as the transverse biasing films.

The magnetic thin films described in Japanese Patent Laid-Open No. Sho 63-164406 are abrasion-resistant thin films for use as magnetic poles of magnetic heads and they are considered to have sufficient magnetic characteristics as transverse biasing films, but the electric resistance of the thin films is not described.

SUMMARY OF THE INVENTION

It is therefore an object of the invention to provide a magnetoresistive head producing a large output using a soft magnetic film having high electric resistance as a transverse biasing film of the magnetoresistive head.

To this end, according to one aspect of the invention, there is provided a magnetoresistive head comprising a magnetoresistive film having electric resistance varying with a magnetic field, a pair of electrodes for causing a current to flow into the magnetoresistive film, and a soft magnetic film for applying a transverse biasing field to the magnetoresistive film. The soft magnetic film is formed of a material having particles composed of at least one compound of zirconium oxide, aluminum oxide, hafnium oxide, titanium oxide, beryllium oxide, magnesium oxide, rare earth oxygen compound, zirconium nitride, hafnium nitride, aluminum nitride, titanium nitride, beryllium nitride, magnesium nitride, silicon nitride, and rare earth nitrogen compound, the particles are dispersed in a metal comprising at least one element of iron, cobalt, and nickel.

In the soft magnetic film, the percentage of the atoms of the compounds except oxygen or nitrogen with respect to all atoms in the the film except oxygen or nitrogen is preferably between 3% to 20%, because if the compound element amount is less than 3%, an increase in the electric resistance is low; while if it is more than 20%, the saturation magnetic flux density lowers to a value which is insufficient for use as the soft magnetic film.

Although the resistivity of the soft magnetic film of the invention increases almost in proportion to the compound addition amount, the soft magnetic film of the magnetoresistive head preferably has a resistivity of 70 $\mu\Omega$cm or more, because an output of the magnetoresistive head is reduced unless the resistivity of the soft magnetic film is sufficiently large compared with that of the magnetoresistive film. Because the resistivity of the magnetoresistive film is 20–30 $\mu\Omega$cm it is preferred that the resistivity of the soft magnetic film is at least twice that of the magnetoresistive film.

Particularly preferably, zirconium oxide, aluminum oxide, and tantalum oxide are named as compounds added to the soft magnetic film. These compounds, which have large binding energy and are stable, can increase electric resistance of the soft magnetic film without degrading the magnetic characteristic thereof.

According to another aspect of the invention, there is provided a method of manufacturing a magnetoresistive head comprising the steps of forming a magnetoresistive film having electric resistance varying with a magnetic field, a pair of electrodes for causing a current to flow into the magnetoresistive film, and a soft magnetic film for applying a transverse biasing field to the magnetoresistive film on a substrate, wherein the soft magnetic film forming step comprises mixing and depositing particles of at least one material of iron, cobalt, and nickel, and particles of at least one compound of zirconium oxide, aluminum oxide, hafnium oxide, titanium oxide, beryllium oxide, magnesium oxide, tantalum oxide rare earth oxygen compound, zirconium nitride, hafnium nitride, aluminum nitride, titanium nitride, beryllium nitride, magnesium nitride, silicon nitride, and rare earth nitrogen compound.

For example, the soft magnetic film can be manufactured by a known method such as the sputtering method or ion beam sputtering method. Powder of an alloy containing at least one material of nickel, iron, and cobalt and powder of any above-mentioned compound can be mixed, sintered, and formed by an appropriate method to provide a target in sputtering or ion beam sputtering. Alternatively, a target comprising a chip of any above-mentioned compound placed on a target containing at least one material of nickel, iron, and cobalt can be used. Such a target enables us to mix and deposit particles containing at least one material of nickel, iron, and cobalt and particles of the compound and deposit them on a substrate at the same time. The soft magnetic film of the invention can also be manufactured by a method in which a metal target composed of nickel, iron, cobalt, etc., and a compound target are placed in a sputtering system and the particles discharged from the targets are substantially mixed and deposited on a substrate.

The soft magnetic film of the magnetoresistive head needs to have both a soft magnetic characteristic and high electric resistance, as described above. These characteristics also need to remain unchanged during the head manufacturing process.

Addition of another element to the metal for increasing electric resistance is a generally used technique. However, if a metal element is added to a soft magnetic film, the added metal element and magnetic element are metallic-bonded, thus the electron state of the magnetic element often changes significantly, impairing the soft magnetic characteristic.

However, the compound contained in the soft magnetic film of the present invention is already ionic-bonded and therefore enables the electric resistance of the film to rise without significantly changing the electron state of the magnetic metal element, namely, without impairing the soft magnetic characteristic. Thus, the soft magnetic film having high electric resistance is used as the soft magnetic film of the magnetoresistive head, thereby decreasing the current diverted to the soft magnetic film and increasing the reproducing voltage of the magnetoresistive head.

Also, the soft magnetic film of the magnetoresistive head of the present invention, which is a crystalline alloy, is thermally stable and is subjected to only a small change in magnetic characteristic when heated.

The compound contained in the soft magnetic film of the present invention is distinguished from impurities inevitably formed during the film manufacturing. The added compound of the present invention exists substantially in the form of a compound in the raw material or the material used to manufacture the film.

The compound contained in the soft magnetic film of the magnetoresistive head of the invention has sufficiently large binding energy. Generally, thin films are manufactured by condensing atoms from a gas phase in a vacuum apparatus. Generally, compounds having small binding energy decompose during the evaporation or condensation process, and oxygen, nitrogen, or the like generated by the decomposition binds with a magnetic element, thus impairing the magnetic characteristic. In contrast, like the compound contained in the soft magnetic film of the invention, compounds having large binding energy do not decompose and are taken into films as intact compounds. The nitrogen compounds of the compounds contained in the soft magnetic films of the present invention are small in binding energy compared with the oxygen compounds contained in the soft magnetic films, but the binding energy of nickel, iron, and cobalt in the magnetic elements with nitrogen, is very small. Therefore, the nitrogen compounds do not decompose and exist stably in the films although they have small binding energy compared with oxygen compounds.

For the content of each compound contained in the soft magnetic film of the invention, preferably the metal element in the compound is 3–20 atomic % of all metal elements contained in the soft magnetic film and particularly more preferably 5–15 atomic %. The compound is dispersed in base metal or alloy as fine particles of preferably 0.01 $\mu$m or less, more preferably 0.001 $\mu$m (10 Å) or less in particle diameter.

To use an Fe—Ni alloy as the base metal of the soft magnetic film, it is preferably an Ni 75–85 atomic %—Fe alloy, and the compound is dispersed based on the alloy composition. If an Fe—Co alloy is used, it is preferably an Fe 30–70 atomic %—Co alloy, particularly preferably an Fe 40–60 atomic %—Co alloy. If an Ni—Co alloy is used, it is preferably an Ni 60–90 atomic %—Co alloy, particularly preferably an Ni 60–80 atomic %—Co alloy.

The metal elements such as nickel, iron, and cobalt and the compound contained in the soft magnetic film of the magnetoresistive head of the invention are dispersed uniformly in the film by mixing the metal element particles and the compound particles and depositing them at the same time. The metal elements and compound are hardly mixed in a bulk state, but are dispersed uniformly, exhibiting a good soft magnetic characteristic, by depositing them at the same time as in the manufacturing method of the invention.

BRIEF DESCRIPTION OF THE DRAWINGS

In the accompanying drawings:

FIG. 6 is a table showing the magnetic characteristics of soft magnetic films according to the embodiment of the invention; and FIG. 7 is a table showing the magnetic characteristics of soft magnetic films according to the embodiment of the invention.

DESCRIPTION OF THE PREFERRED EMBODIMENTS

Figure 3:
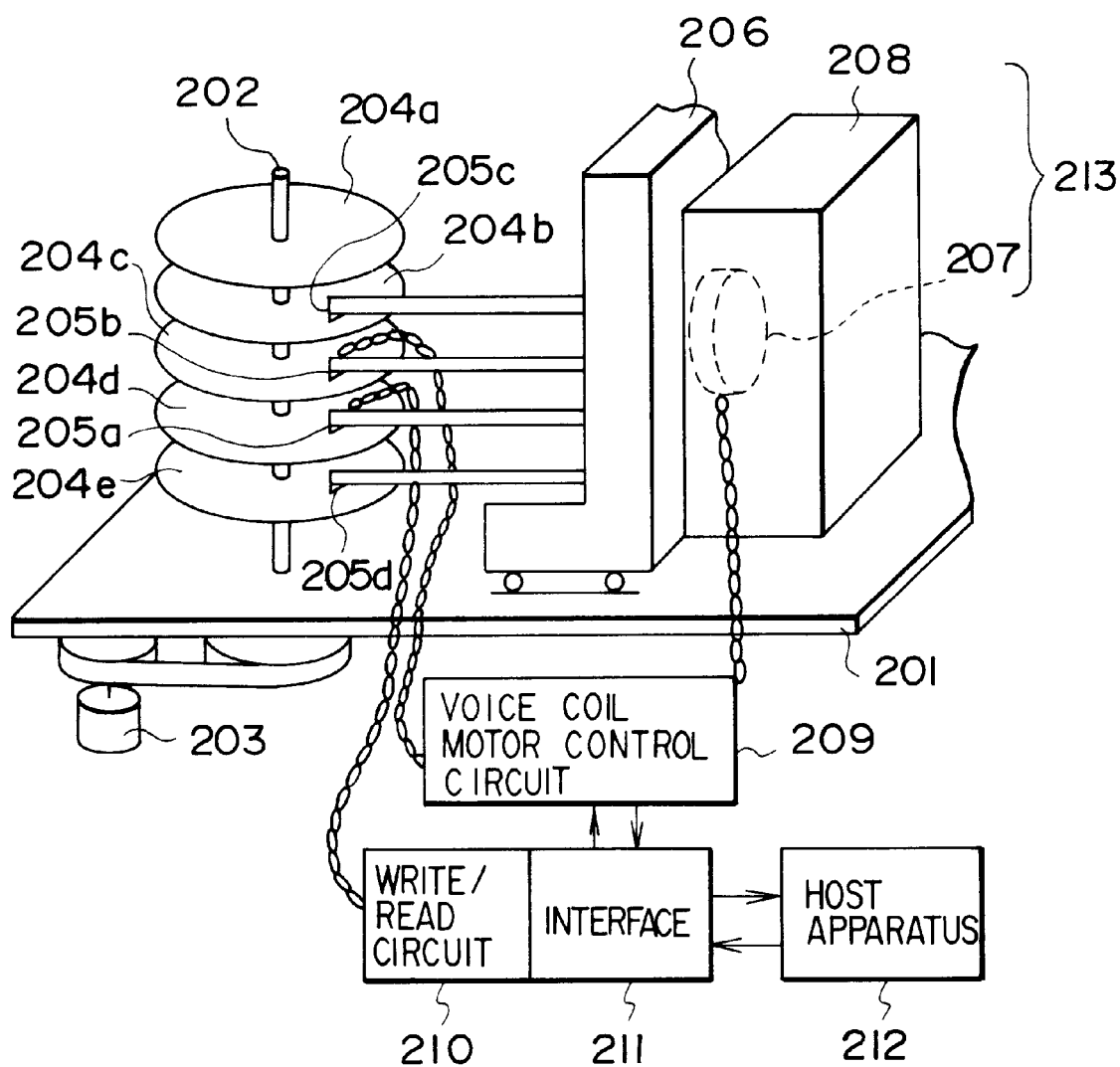
FIG. 3 is a block diagram showing the configuration of a magnetic disk unit comprising magnetoresistive heads of the invention.

One embodiment of a magnetic disk unit to which magnetoresistive heads of the invention are applied will be discussed with reference to FIG. 3, a perspective view showing a schematic structure of the magnetic disk unit.

The schematic structure of the magnetic disk unit will be discussed. As shown in FIG. 3, the magnetic disk unit comprises a spindle 202, a plurality of magnetic disks 204a, 204b, 204c, 204d, and 204e located on the spindle 202 and equally spaced from each other, and a motor 203 for driving the spindle 202. It further comprises a movable carriage 206, magnetic heads 205a, 205b, 205c and 205d held by the carriage 206, a magnet 208 and a voice coil 207 which make up a voice coil motor 213 for driving the carriage 206, and a base 201 supporting the components. It also includes a voice coil motor controller 209 for controlling the voice coil motor 213 in response to a signal output from a host system 212 such as a magnetic disk controller and a write/read circuit 210 which has a function of converting data sent from the host system 212 into a current to be made to flow into the magnetic heads conforming to the write system of the magnetic disks 204a, etc., and a function of amplifying data sent from the magnetic disks 204a, etc., and converting them into a digital signal. The write/read circuit 210 is connected to the host system 212 via an interface 211.

Next, the operation of the magnetic disk unit will be discussed by taking data read from the magnetic disk 204d as an example. The host system 212 sends a specification of data to be read to the voice coil motor controller 209 via the interface 211.

The voice coil motor 213 drives the carriage 206 in response to the control current from the voice coil motor controller 209 for moving the magnetic heads 205a, 205b, 205c, and 205d at high speed to the track position where the specified data is stored on the magnetic disk 204d and accurately positioning the heads. To perform this positioning, the positioning magnetic head 205b connected to the voice coil motor controller 209 detects the position on the magnetic disk 204d and provides it for performing position control of the data magnetic head 205a. The motor 203 supported by the base 201 rotates the magnetic disks 204a, 204b, 204c, 204d, and 204e (each 3.5 inches in diameter) mounted on the spindle 202. Next, in response to a signal from the write/read circuit 210, the specified magnetic head 205a is selected and the top position of the specified area is detected. Then, the data magnetic head 205a connected to the write/read circuit 210 reads data signals on the magnetic disk 204d by transferring signals to and from the magnetic disk 204d. The read data is converted into predetermined signals, which are sent to the host system 212.

Next, the structure of each of the magnetic heads 205a–205d of the magnetic disk unit in FIG. 3 will be discussed.

Figure 5:
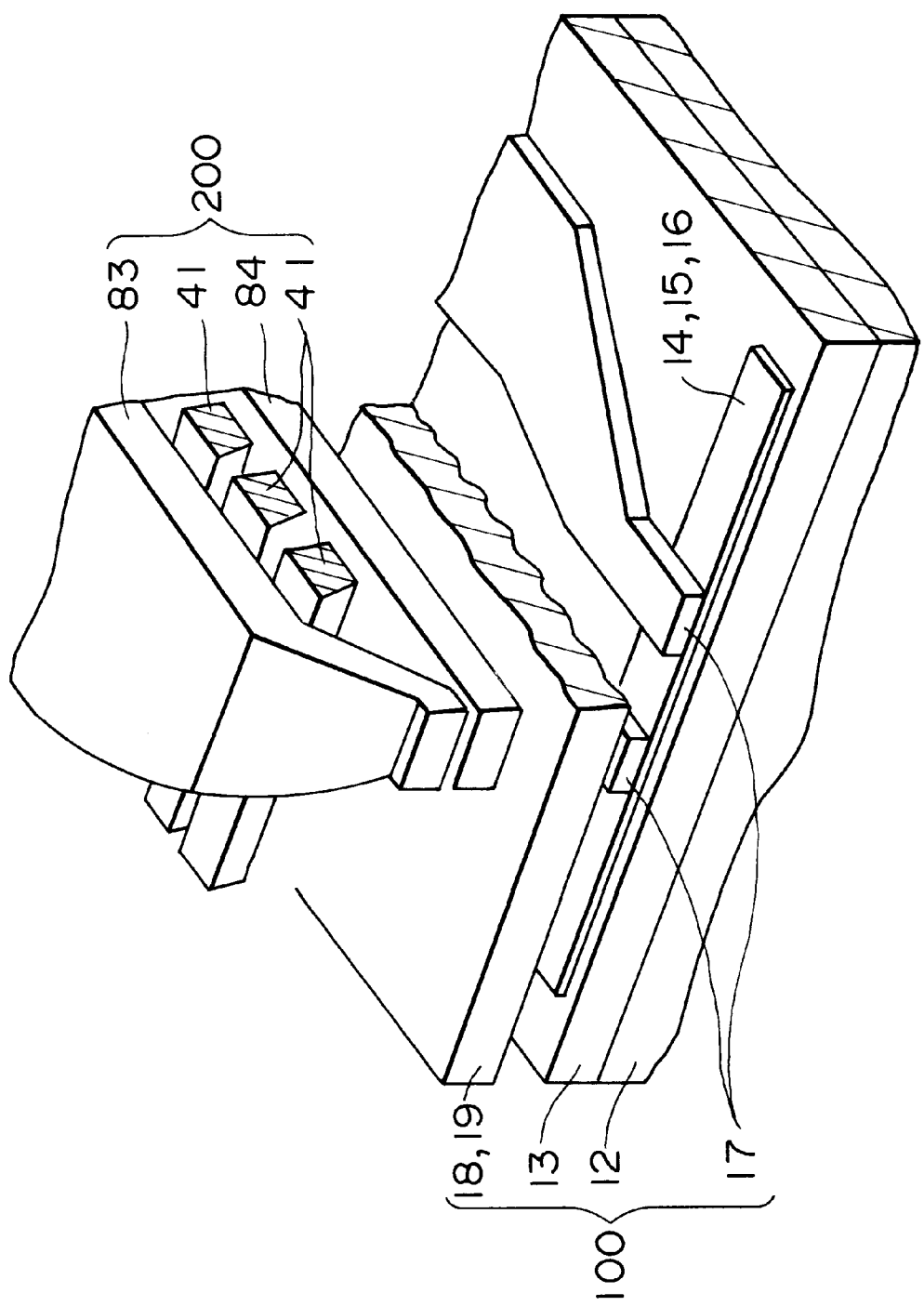
FIG. 5 is a cutaway view, in perspective, of a magnetic head comprising the magnetoresistive head in FIG. 1.

Each of the magnetic heads 205a–205d comprises a write-only induction type magnetic head 200 laminated on a read (i.e. reproduction)-only magnetoresistive head 100, as shown in FIG. 5.

This will be further described.

Figure 1:
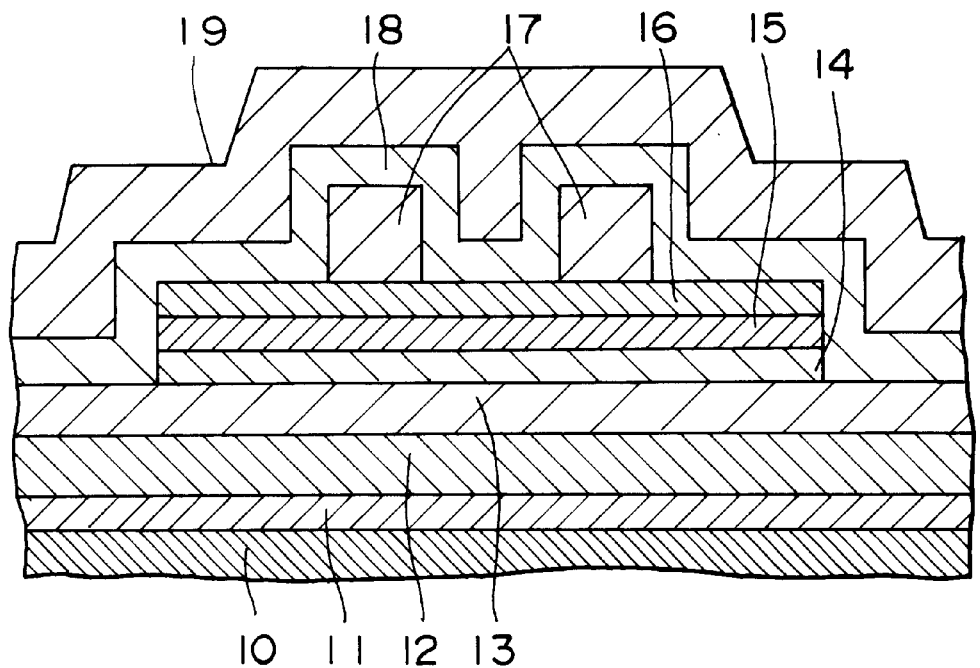
FIG. 1 is a sectional view showing the structure of a magnetoresistive head according to one embodiment of the invention.
Figure 4:
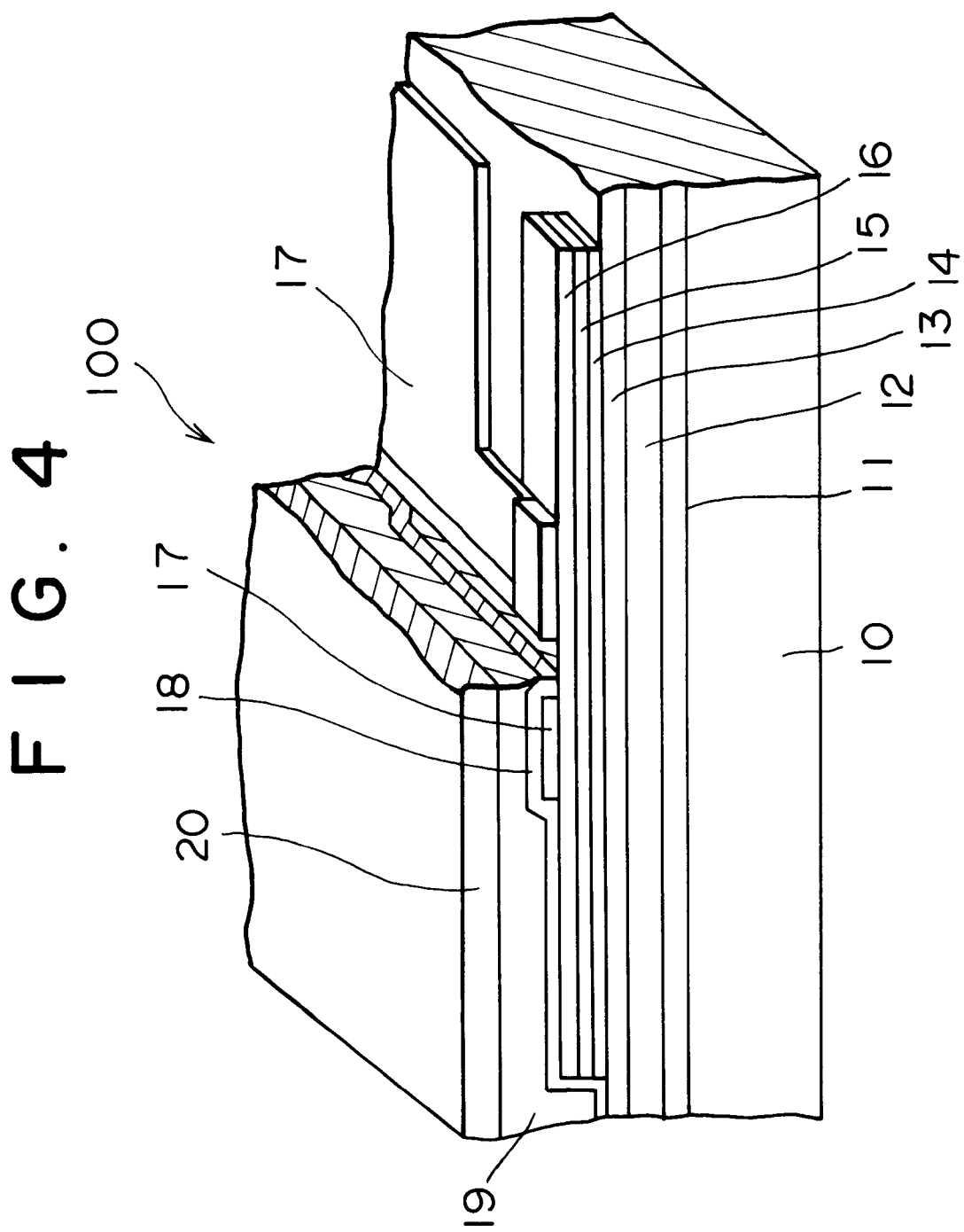
FIG. 4 is a cutaway view, in perspective, of the magnetoresistive head in FIG. 1.

A lower insulator 11, a lower shield film 12, and a lower gap film 13 are laminated on a substrate 10, as shown in FIGS. 1 and 4. Further, a magnetoresistive film 14, a spacer 15, and a soft magnetic film 16 are placed in order on the lower gap film 13. A pair of electrodes 17 are placed on the soft magnetic film 16, and an upper gap film 18, an upper shield film 19, and an upper insulator 20 are formed so as to cover the whole structure.

The lower and upper insulators 11 and 20 are films for electrically insulating the films sandwiched therebetween from the outside. The lower and upper shield films 12 and 19 are placed to prevent any external magnetic field other than the signal magnetic field of the magnetic disks from affecting the magnetoresistive film 14. The lower and upper gap films 13 and 18 have a function of electrically and magnetically isolating the films sandwiched therebetween from the lower and upper shield films 12 and 19. The magnetoresistive film 14 is a ferromagnetic film having electric resistance varying with the magnetization direction of the magnetic disk. The soft magnetic film 16 applies a biasing field in the direction perpendicular to the actual page of FIG. 1, namely, a transverse biasing field to the magnetoresistive film 14. The spacer 15 is placed to magnetically separate the magnetoresistive film 14 and the soft magnetic film 16.

The induction type magnetic head 200 is placed on the upper shield film 19. It comprises a lower magnetic film 84, coils 41, and an upper magnetic film 83.

A signal is written onto the magnetic disk 204a, etc., by the induction type magnetic head 200 and a signal on the magnetic disk 204a, etc., is reproduced by the magnetoresistive head 100.

Since the sensing portion of the magnetoresistive head and the magnetic gap of the induction type magnetic head overlap each other, simultaneous positioning can be performed to the same track of the magnetic disk 204a, etc.

A manufacturing method and material of the magnetoresistive head will be discussed.

As the lower insulator 11, an alumina film about 10 $\mu$m thick is formed by sputtering on the substrate 10 made of ceramic, and the film surface is polished. Then, an alloy film of nickel and iron about 2 $\mu$m thick is formed as the lower magnetic shield film 12. After the lower magnetic shield film has been worked to a predetermined form, an alumina film of about 0.4 $\mu$m thick is formed as the lower gap film 13 on top of the lower magnetic shield film.

A nickel and iron alloy film of about 400 Å (which denotes angstroms) thick is formed as the magnetoresistive film 14 on top of the lower gap film. A tantalum film of about 200 Å thick is formed as the spacer 15 on top of the magnetoresistive film. Further, on top of the spacer, a soft magnetic film of about 400 Å thick comprising 10% zirconium oxide added to a magnetic alloy consisting of 80 atomic % nickel and iron in the remaining part is formed by sputtering as the soft magnetic film 16 for applying a transverse biasing field to the magnetoresistive film. The zirconium oxide is dispersed in the soft magnetic film 16 in a fine particle state.

The expression "10% zirconium oxide added" in this specification means that zirconium oxide is added so that zirconium atoms become 10 atomic % of metal atoms contained in the soft magnetic film 16.

The sputtering of the soft magnetic film 16 is performed using a target comprising a zirconium oxide chip placed on an alloy target of nickel and iron. The Ar gas pressure during the sputtering is 2 mTorr, and the substrate temperature is a room temperature.

In the embodiment, the soft magnetic film comprises zirconium oxide added to an alloy of nickel and iron, which is selected as a typical soft magnetic film of the invention; although the invention is not limited to such a film.

After the soft magnetic film 16 is formed, the magnetoresistive film 14, the spacer 15, and the soft magnetic film 16 are worked to a predetermined form as shown in FIG. 4. Formed on the soft magnetic film are a pair of electrodes 17 for causing a detection current to flow there into for reading an electric resistance change of the magnetoresistive film 14.

Further, thereon, an alumina film 0.3 μm thick is formed as the upper gap film 18, and the upper magnetic shield 19 is formed on top of the upper gap film. Further, the upper insulator 20 is formed on the upper magnetic shield, and then an induction type magnetic head for recording is manufactured, which will not be discussed.

After this, the substrate 10 is cut and worked to a slider. The magnetic head manufacturing is now complete.

Next, the characteristics of the magnetoresistive head of the embodiment will be discussed. The magnetoresistive head is evaluated based on reproducing output. The magnetic head of the embodiment of the present invention and a head using an alloy of nickel and iron to which 5 atomic % niobium is added for comparison as a soft magnetic film in a similar structure are evaluated.

The soft magnetic film 16 to which zirconium oxide is added in the embodiment has saturation a magnetic flux density of about 0.7 T and resistivity about 120 μΩcm. For comparison, the alloy film of nickel and iron to which 5 atomic % niobium is added has a saturation magnetic flux density of about 0.6 T and resistivity about 70 μΩcm.

Reproducing output of the magnetoresistive head using the alloy film of nickel and iron to which 5 atomic % niobium is added as the soft magnetic film 16 is about 400 μV at a frequency of of about 10 MHz.

On the other hand, reproducing output of the magnetic head of the invention is about 440 μV, which is 10% larger. The head using the alloy film of nickel and iron to which niobium is added as the soft magnetic film 16 has the soft magnetic film which is small in resistivity, so that detection current flows into both the magnetoresistive film and the soft magnetic film and a change in read resistance is reduced.

The electric resistance of the alloy film of nickel and iron to which niobium is added can be raised by increasing the amount of niobium added. However, if the niobium addition amount is increased, the saturation magnetic flux density lowers remarkably. Therefore, 5 atomic % of niobium is the limit of the addition amount and the resistivity cannot be raised any further.

Thus, the magnetoresistive head of the embodiment of the present invention using an alloy film of nickel and iron to which zirconium oxide is added as the soft magnetic film 16 contains a soft magnetic film which is large in electric resistance, and can provide high reproducing output.

Next, the electric resistance of the soft magnetic film 16 of the magnetoresistive head of the present invention will be discussed.

Figure 2:
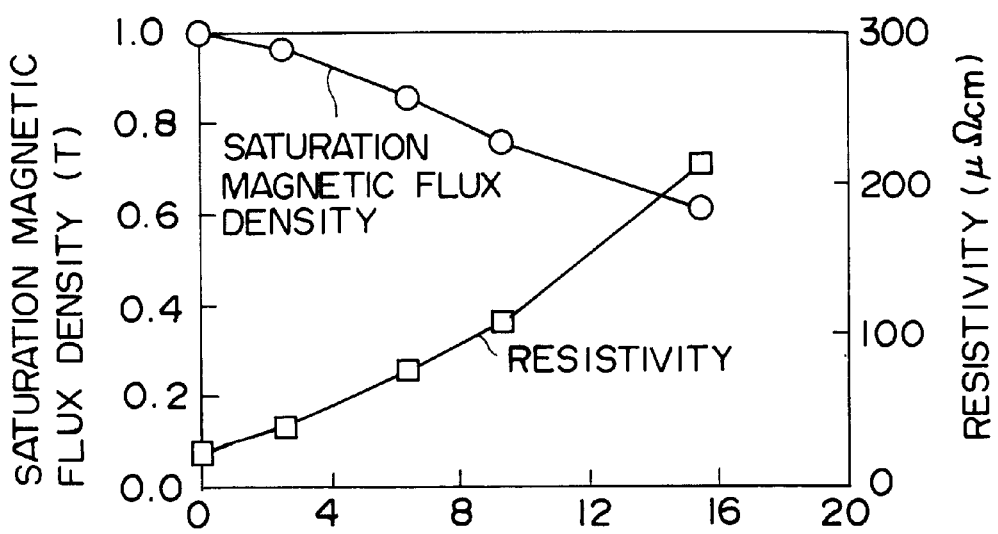
FIG. 2 is a graph showing the relationships among the aluminum oxide addition amount, saturation magnetic flux density, and resistivity of a soft magnetic film comprising aluminum oxide added to an alloy of nickel and iron.

FIG. 2 shows the resistivity and saturation magnetic flux density of a magnetic alloy film consisting of 80 atomic % nickel and iron in the remaining part to which aluminum oxide is added.

The film is 400 Å thick. When the aluminum oxide is added, the electric resistance of the film increases. The resistance becomes 100 μΩcm when the addition amount is about 10%. (The expression "addition amount 10%" in the specification means addition of the aluminum oxide so that aluminum atoms become 10 atomic % of all metal atoms of the magnetic alloy film.) On the other hand, the saturation magnetic flux density decreases monotonically when the aluminum oxide is added, and becomes about 0.75 T when the addition amount is 10%.

This is an example of adding the aluminum oxide as a compound. If other compounds are added, a similar trend is shown. Films with high resistivity can be manufactured by adding a compound. It is difficult to provide such films with high resistivity by conventional metal element addition. It is seen that addition of a compound is effective to provide films with high resistivity.

As seen in FIG. 2, resistivity of about 40 μΩcm or more and saturation magnetic flux density of 0.5 T or more can be provided by adding the aluminum oxide so that aluminum atoms become 3 atomic % or more of all metal atoms in the soft magnetic film 16. Preferably, the aluminum oxide addition amount is determined so that the resistivity and saturation magnetic flux density of the soft magnetic film 16 have the following relationships: The aluminum oxide is added in such an amount as to allow the saturation magnetic flux density (T) to become at least a value resulting from subtracting 0.1 from −20 (resistivity (μΩcm)/355)+1.06 when the resistivity of the soft magnetic film 16 is less than 110 μΩcm. The aluminum oxide is added in an amount so as to allow the saturation magnetic flux density (T) to become a value or more resulting from subtracting 0.1 from−(resistivity (μΩcm)/714)+0.91 when the resistivity of the soft magnetic film 16 is 110 μΩcm or more. More preferably, the aluminum oxide is added so as to provide a larger saturation magnetic flux density than those found from the expressions.

Next, the characteristics of soft magnetic films containing various compounds of the invention which can be used as the soft magnetic film 16 will be discussed.

FIG. 6 lists the values of the coercive force, anisotropy field, and saturation magnetic flux density of soft magnetic films provided by adding about 5% zirconium oxide, aluminum oxide, hafnium oxide, titanium oxide, beryllium oxide, magnesium oxide, cerium oxide as a rare earth oxygen compound, zirconium nitride, hafnium nitride, aluminum nitride, titanium nitride, beryllium nitride, magnesium nitride, silicon nitride, or cerium nitride to a soft magnetic film consisting of 80 atomic % of nickel and iron in the remaining part. (The expression "adding about 5%" in the specification means addition of each of the compounds in such an amount as to allow the metal atoms contained in the compound to become about 5 atomic % of all metal atoms of the soft magnetic film.) Each compound is dispersed in the soft magnetic film in a fine particle state.

For comparison, FIG. 6 also shows the magnetic characteristics when silicon oxide and metal zirconium are added.

The soft magnetic films shown in FIG. 6 are produced by a sputtering method using a target comprising a chip of each compound placed on an alloy target of nickel and iron. The Ar gas pressure during the sputtering is 2 mTorr and the film thickness is 400 Å.

Each of the soft magnetic films shown in FIG. 6 has a resistivity of about 70 μΩcm. The soft magnetic films of the present invention are similar in coercive force, anisotropy field, and saturation magnetic flux density to each other, almost independently of the type of compound.

In contrast, the film to which silicon oxide is added as a control example has a large anisotropy field of 15 Oe. The possible reason why the film is large in anisotropic magnetic filed is that the silicon oxide, which is small in binding energy, is decomposed into oxygen and silicon while the film is produced and that the oxygen is combined with iron or nickel to form an oxide within the film.

On the other hand, the nitrogen compounds added to the soft magnetic film of the embodiment are small in binding energy compared with the oxygen compounds, but the bond of magnetic elements iron, cobalt, and nickel with nitrogen is very weak.

Thus, it is considered that the magnetic elements do not form a compound, thus not degrading the magnetic characteristics. This indicates that if the binding energy of an added compound is sufficiently large compared with that of a similar compound formed by a magnetic element, the magnetic characteristic is improved.

It is expected that the magnetic characteristic will also be improved with other compounds, such as carbide, chloride, and fluoride. However, no experiment is conducted because the carbide will pollute vacuum apparatus to a remarkable extent and most chlorides and fluorides are soluble in water and weak in terms of corrosion resistance of films.

The film to which zirconium is added as a control example lessens in coercive force and anisotropy field, but decreases greatly in saturation magnetic flux density to about 0.5 T. This indicates that addition of zirconium intact as metal would largely change the electron state of the magnetic element and that addition of zirconium as a compound of oxygen or nitrogen as in the invention is effective.

Next, the magnetic characteristics of soft magnetic films of the invention comprising zirconium oxide added to alloys indicating soft magnetic properties will be discussed. FIG. 7 lists the values of the coercive force, anisotropy field, and saturation magnetic flux density of soft magnetic films provided by adding 5% zirconium oxide to iron, an alloy of iron and cobalt, and an alloy of nickel and cobalt, magnetic metallic substances. (The expression "adding 5%" in the specification means addition of zirconium oxide so that the zirconium atoms become 5 atomic % of all metal atoms of the soft magnetic film.)

The alloy of iron and cobalt consists of 50 atomic % iron and cobalt in the remaining part. The alloy of nickel and cobalt consists of 70 atomic % nickel and cobalt in the remaining part.

The soft magnetic films of the invention shown in FIG. 7 are produced by a sputtering method using a target comprising a chip of zirconium oxide placed on the above-mentioned magnetic metal target. The Ar gas pressure during the sputtering is 2 mTorr. To bestow magnetic anisotropy, a magnetic field of about 40 Oe is applied during the sputtering. The film thickness is 0.1 μm.

For comparison, FIG. 7 also shows the magnetic characteristics when no zirconium oxide is added. In FIG. 7, a blank in the column of anisotropy field denotes that no obvious magnetic anisotropy is observed on an M-H loop (a loop showing applied magnetic field and magnetization of the film) and an anisotropy field cannot be measured.

As seen in FIG. 7, when the magnetic metallic substance is iron, the film to which no zirconium oxide is added provides a large coercive force of 8 Oe and does not show obvious magnetic anisotropy. In contrast, the soft magnetic film of the invention to which zirconium oxide is added decreases in coercive force to about 3 Oe and magnetic anisotropy is observed as an anisotropy field 7 Oe. The alloy film of iron and cobalt, and that of nickel and cobalt to which zirconium oxide is added, also decrease in coercive force compared with those to which no zirconium oxide is added. Addition of zirconium oxide improves the soft magnetic characteristic.

As described above, a soft magnetic film made of material having particles of at least one compound of, zirconium oxide, aluminum oxide, hafnium oxide, titanium oxide, beryllium oxide, magnesium oxide, tantalum oxide, rare earth oxygen compound, zirconium nitride, hafnium nitride, aluminum nitride, titanium nitride, beryllium nitride, magnesium nitride, silicon nitride, and rare earth nitrogen compound, the particles being dispersed in metal material containing at least one element of iron, cobalt, and nickel, is used as the soft magnetic film of the magnetoresistive head, whereby the current diverted from the magnetoresistive film to the soft magnetic film decreases and a magnetoresistive head providing a large reproducing output can be manufactured.

Such a soft magnetic film can be formed by mixing and depositing particles of at least one material of iron, cobalt, and nickel, and particles of at least one compound of zirconium oxide, aluminum oxide, hafnium oxide, titanium oxide, beryllium oxide, magnesium oxide, rare earth oxygen compound, zirconium nitride, hafnium nitride, aluminum nitride, titanium nitride, beryllium nitride, magnesium nitride, silicon nitride, and rare earth nitrogen compound, as in the above-mentioned sputtering method.

The magnetic disk unit comprising such magnetoresistive heads and providing a large reproducing output can reproduce magnetic disk signals at high sensitivity.

The magnetoresistive head having the magnetoresistive film 14, the soft magnetic film 16, and the electrodes 17 laminated in order from the substrate to the top is shown in the embodiment, but they need not necessarily be placed in the order mentioned above.

As described above, in the invention, the soft magnetic film having high electric resistance is used as the transverse biasing film of the magnetoresistive head, so that a magnetoresistive head of a high output can be provided.

What is claimed is:

1. A magnetoresistive head comprising:
    a magnetoresistive film having electric resistance varying with a magnetic field;
    a pair of electrodes for causing a current to flow into said magnetoresistive film;
    a soft magnetic film for applying a transverse biasing field to said magnetoresistive film; and
    a spacer film disposed between said magnetoresistive film and said soft magnetic film for magnetically separating said magnetoresistive film from said soft magnetic film,
    said soft magnetic film comprising
        a metal including at least one element selected from the group of iron, cobalt and nickel, and
        one or more compounds selected from the group of zirconium oxide, aluminum oxide, hafnium oxide, titanium oxide, beryllium oxide, magnesium oxide, tantalum oxide, a rare earth oxide, zirconium nitride, hafnium nitride, aluminum nitride, titanium nitride, beryllium nitride, magnesium nitride, silicon nitride and a rare earth nitride, said one or more compounds being dispersed in said metal having substantially the same form.

2. The magnetoresistive head of claim 1 wherein said metal is an alloy comprising at least two elements selected from the group of iron, cobalt and nickel.

3. The magnetoresistive head of claim 2 wherein said alloy is an alloy of nickel and iron including 78–84 atomic percent of nickel and balanced with iron.

4. The magnetoresistive head of claim 1 wherein atoms of said one or more compounds included in said soft magnetic film except oxygen or nitrogen are between 3 atomic percent and 20 atomic percent of all atoms making up said soft magnetic film except oxygen or nitrogen.

5. The magnetoresistive head of claim 1 wherein said soft magnetic film includes zirconium oxide and wherein zirconium atoms included in said soft magnetic film are between 3 atomic percent and 20 atomic percent of all atoms making up said soft magnetic film except oxygen or nitrogen.

6. The magnetoresistive head of claim 1 wherein said soft magnetic film includes aluminum oxide and wherein aluminum atoms included in said soft magnetic film are between 3 atomic percent and 20 atomic percent of all atoms making up said soft magnetic film except oxygen or nitrogen.

7. The magnetoresistive head of claim 1 wherein said soft magnetic film includes tantalum oxide and wherein tantalum atoms included in said soft magnetic film are between 3 atomic percent and 20 atomic percent of all atoms making up said soft magnetic film except oxygen or nitrogen.

8. The magnetoresistive head of claim 1 wherein the resistivity of said soft magnetic film is 70 $\mu\Omega$cm or more.

9. The magnetoresistive head of claim 1 wherein said soft magnetic film has saturation magnetic flux density Bs(T) exhibiting 0.5 T or more and resistivity $\rho$ ($\mu\Omega$cm) exhibiting 40 $\mu\Omega$cm or more, and Bs and $\rho$ satisfy the following equations:

$$Bs \geq -\rho/355+0.96 (if 40 \ \mu\Omega cm \leq \rho < 100 \ \mu\Omega cm)$$

$$Bs \geq -\rho/714+0.81 (if 100 \ \mu\Omega cm \leq \rho \leq 300 \ \mu\Omega cm).$$

10. The magnetoresistive head according to claim 1, wherein said one or more compounds are selected from the group of zirconium oxide, aluminum oxide, hafnium oxide, titanium oxide, beryllium oxide, magnesium oxide, tantalum oxide, and a rare earth oxide.

11. Method of manufacturing a magnetoresistive head comprising the steps of:
 forming a magnetoresistive film having electric resistance varying with a magnetic field;
 forming a pair of electrodes for causing a current to flow into said magnetoresistive film;
 forming a soft magnetic film for applying a transverse biasing field to said magnetoresistive film; and
 forming a spacer film disposed between said magnetoresistive film and said magnetic film for magnetically separating said magnetoresistive film from said magnetic film,
 wherein said step of forming said soft magnetic film comprises simultaneously depositing a metal comprising at least one element selected from the group of iron, cobalt and nickel, and one or more compounds selected from the group of zirconium oxide, aluminum oxide, hafnium oxide, titanium oxide, beryllium oxide, magnesium oxide, tantalum oxide, a rare earth oxide, zirconium nitride, hafnium nitride, aluminum nitride, titanium nitride, beryllium nitride, magnesium nitride, silicon nitride, and a rare earth nitride, and said one or more compounds being dispersed in said metal having substantially the same form.

12. The method of manufacturing a magnetoresistive head of claim 11 wherein, in the step of forming said soft magnetic film, said one or more compounds are dispersed in said metal at a predetermined rate with respect to said metal, said predetermined rate being decided so that said soft magnetic film has saturation magnetic flux density Bs (T) exhibiting 0.5 T or more and resistivity $\rho$ ($\mu\Omega$cm) exhibiting 40 $\mu\Omega$cm or more, and that Bs and $\rho$ satisfy the following equations:

$$Bs \geq -\rho/355+0.96 (if \ 40 \ \mu\Omega cm \leq \rho < 100 \ \mu\Omega cm)$$

$$B \geq -\rho/714+0.81 (if \ 100 \ \mu\Omega cm \leq \rho \leq 300 \ \mu\Omega cm).$$

13. The method of manufacturing a magnetoresistive head according to claim 11, wherein said one or more compounds are selected from the group of zirconium oxide, aluminum oxide, hafnium oxide, titanium oxide, beryllium oxide, magnesium oxide, tantalum oxide, and a rare earth oxide.

14. A magnetic reproducing apparatus comprising:
 a magnetic head;
 means for supporting a recording medium;
 drive means for moving said magnetic head relative to the recording medium; and
 a signal processor for processing a signal generated by said magnetic head,
 said magnetic head comprising a magnetoresistive film having electric resistance varying with a magnetic field, a pair of electrodes contacting said magnetoresistive film for causing a current to flow into said magnetoresistive film, a soft magnetic film disposed over said magnetoresistive film for applying a transverse biasing field to said magnetoresistive film, and
 a spacer film placed between said magnetoresistive film and said magnetic film for magnetically separating said magnetoresistive film from said soft magnetic film,
 said soft magnetic film comprising
  a metal including at least one element selected from the group of iron, cobalt and nickel, and
  one or more compounds selected from the group of zirconium oxide, aluminum oxide, hafnium oxide, titanium oxide, beryllium oxide, magnesium oxide, tantalum oxide, a rare earth oxide, zirconium nitride, hafnium nitride, aluminum nitride, titanium nitride, beryllium nitride, magnesium nitride, silicon nitride, and a rare earth nitride, said one or more compounds being dispersed in said metal having substantially the same form.

15. The magnetic reproducing apparatus of claim 14 wherein said soft magnetic film has saturation magnetic flux density Bs (T) exhibiting 0.5 T or more and resistivity $\rho$ ($\mu\Omega$cm) exhibiting 40 $\mu\Omega$cm or more, and $$Bs \geq -\rho/355+0.96 (if \ 40 \ \mu\Omega cm \leq \rho < 100 \ \mu\Omega cm)$$

$$Bs \geq -\rho/714+0.81 (if \ 100 \ \mu\Omega cm \leq \rho \leq 300 \ \mu\Omega cm).$$

16. The magnetic reproducing apparatus according to claim 14, wherein said one or more compounds are selected from the group of zirconium oxide, aluminum oxide, hafnium oxide, titanium oxide, beryllium oxide, magnesium oxide, tantalum oxide, and a rare earth oxide.

17. A magnetoresistive head comprising:
 a magnetoresistive film having electric resistance varying with a magnetic field;
 a pair of electrodes for causing a current to flow into said magnetoresistive film;
 a soft magnetic film for applying a transverse biasing field to said magnetoresistive film;
 a spacer film disposed between said magnetoresistive film and said soft magnetic film for magnetically separating said magnetoresistive film from said soft magnetic film,
 said soft magnetic film comprising one or more compounds selected from the group of zirconium oxide, aluminum oxide, hafnium oxide, titanium oxide, beryllium oxide, magnesium oxide, tantalum oxide, a rare earth oxide, zirconium nitride, hafnium nitride, aluminum nitride, titanium nitride, beryllium nitride, magnesium nitride, silicon nitride, and a rare earth nitride,
 said one or more compounds dispersed in a metal having substantially the same form,
 said metal being any one of an alloy of nickel and iron including 75–85 atomic percent of nickel and balanced with iron, an alloy of cobalt and iron including 30–70 atomic percent of cobalt and balanced with iron, and an alloy of nickel and cobalt including 60–90 atomic percent of nickel and balanced with cobalt;

and said one or more compounds being dispersed in said metal at a predetermined rate with respect to said metal, said predetermined rate being decided so that all atoms except oxygen or nitrogen of said one or more compounds are between 3 atomic percent and 20 atomic percent of all atoms except oxygen or nitrogen making up said magnetic film.

18. The magnetoresistive head according to claim 17, wherein said one or more compounds are selected from the group of zirconium oxide, aluminum oxide, hafnium oxide, titanium oxide, beryllium oxide, magnesium oxide, tantalum oxide, and a rare earth oxide.

19. A method of manufacturing a magnetoresistive head comprising the steps of:

forming a magnetoresistive film having electric resistance varying with a magnetic field;

forming a pair of electrodes for causing a current to flow into said magnetoresistive film;

forming a soft magnetic film for applying a transverse biasing field to said magnetoresistive film;

forming a spacer film disposed between said magnetoresistive film and said soft magnetic film for magnetically separating said magnetoresistive film from said soft magnetic film, wherein said step of forming said soft magnetic film comprises simultaneously depositing a metal and one or more compounds so that said one or more compounds are dispersed in said metal, said metal being any one of an alloy of nickel and iron including 75–85 atomic percent of nickel and balanced with iron, an alloy of cobalt and iron including 30–70 atomic percent of cobalt and balanced with iron, and an alloy of nickel and cobalt including 60–90 atomic percent of nickel and balanced with cobalt;

said one or more compounds being selected from the group of zirconium oxide, aluminum oxide, hafnium oxide, titanium oxide, beryllium oxide, magnesium oxide, tantalum oxide, a rare earth oxide, zirconium nitride, hafnium nitride, aluminum nitride, titanium nitride, beryllium nitride, magnesium nitride, silicon nitride, and a rare earth nitride, wherein said one or more compounds are deposited so as to be dispersed in said metal at a predetermined rate with respect to said metal, said predetermined rated being decided so that all atoms except oxygen or nitrogen of said one or more compounds are between 3 atomic percent and 20 atomic percent of all atoms except oxygen or nitrogen making up said soft magnetic film, and wherein said one or more compounds are dispersed in said metal having substantially the same form.

20. The method of manufacturing a magnetoresistive head according to claim 19, wherein said one or more compounds are selected from the group of zirconium oxide, aluminum oxide, hafnium oxide, titanium oxide, beryllium oxide, magnesium oxide, tantalum oxide, and a rare earth oxide.

21. A magnetoresistive reproducing apparatus comprising:

a magnetic head;

means for supporting a recording medium;

drive means for moving said magnetic head relative to the recording medium; and a signal processor for processing a signal reproduced by said magnetic head;

said magnetic head comprising:

a magnetoresistive film having electric resistance varying with a magnetic field;

a pair of electrodes for causing a current to flow into said magnetoresistive film;

a soft magnetic film for applying a transverse biasing field to said magnetoresistive film, and a spacer film placed between said magnetoresistive film and said soft magnetic film for magnetically separating said magnetoresistive film from said soft magnetic film, said soft magnetic film comprising one or more compounds selected from the group of zirconium oxide, aluminum oxide, hafnium oxide, titanium oxide, beryllium oxide, magnesium oxide, tantalum oxide, a rare earth oxide, zirconium nitride, hafnium nitride, aluminum nitride, titanium nitride, beryllium nitride, magnesium nitride, silicon nitride, and a rare earth nitride, said one or more compounds being dispersed in a metal having substantially the same form, said metal being any one of an alloy of nickel and iron including 75–85 atomic percent of nickel and balanced with iron, an alloy of cobalt and iron including 30–70 atomic percent of cobalt and balanced with iron, and an alloy of nickel and cobalt including 60–90 atomic percent of nickel and balanced with cobalt, and said one or more compounds being dispersed in said metal at a predetermined rate with respect to said metal, said predetermined rate being decided so that all atoms except oxygen or nitrogen of said one or more compounds are between 3 atomic percent and 20 atomic percent of all atoms except oxygen or nitrogen making up said soft magnetic film.

22. The magnetoresistive reproducing apparatus according to claim 21, wherein said one or more compounds are selected from the group of zirconium oxide, aluminum oxide, hafnium oxide, titanium oxide, beryllium oxide, magnesium oxide, tantalum oxide, and a rare earth oxide.

* * * * *